US006987328B2

(12) United States Patent
Osborne

(10) Patent No.: US 6,987,328 B2
(45) Date of Patent: Jan. 17, 2006

(54) POWER EQUIPMENT APPARATUS HAVING A POWER GENERATION SYSTEM

(75) Inventor: Christopher M. Osborne, Efland, NC (US)

(73) Assignee: Honda Motor Company, Ltd., Tokyo (JP)

(*) Notice: Subject to any disclaimer, the term of this patent is extended or adjusted under 35 U.S.C. 154(b) by 133 days.

(21) Appl. No.: 10/720,547

(22) Filed: Nov. 24, 2003

(65) Prior Publication Data

US 2004/0135373 A1 Jul. 15, 2004

Related U.S. Application Data

(60) Provisional application No. 60/428,445, filed on Nov. 22, 2002.

(51) Int. Cl.
*H02P 9/04* (2006.01)

(52) U.S. Cl. .................. 290/1 R; 290/1 A; 322/10

(58) Field of Classification Search ............ 290/1 R, 290/1 A, 40 R; 322/10, 12, 28
See application file for complete search history.

(56) References Cited

U.S. PATENT DOCUMENTS

| 4,320,822 | A |   | 3/1982  | Meldahl et al. |
|-----------|---|---|---------|----------------|
| 4,398,081 | A |   | 8/1983  | Moad |
| 4,507,566 | A | * | 3/1985  | Leatherman et al. ...... 290/38 R |
| 4,539,483 | A | * | 9/1985  | Freeny, Jr. .................. 290/1 R |
| 4,559,768 | A |   | 12/1985 | Dunn ......................... 56/16.9 |
| 4,672,296 | A |   | 6/1987  | Griffin |
| 4,870,811 | A | * | 10/1989 | Steele ........................ 56/10.5 |
| 4,964,265 | A |   | 10/1990 | Young ........................ 56/10.8 |
| 5,204,814 | A |   | 4/1993  | Noonan et al. ........ 364/424.02 |
| 5,504,417 | A | * | 4/1996  | Kern et al. .................. 322/32 |
| 5,563,774 | A | * | 10/1996 | Welsch ....................... 362/459 |
| 5,675,222 | A |   | 10/1997 | Fliege |
| 5,794,422 | A |   | 8/1998  | Reimers et al. .............. 56/11.9 |
| 5,911,670 | A |   | 6/1999  | Angott et al. ................ 56/10.2 |
| 5,965,999 | A | * | 10/1999 | Frank ............................ 322/1 |
| 6,082,084 | A |   | 7/2000  | Reimers et al. |
| 6,181,019 | B1| * | 1/2001  | Frank ......................... 290/1 A |
| 6,182,784 | B1|   | 2/2001  | Pestotnik |
| 6,321,515 | B1|   | 11/2001 | Colens |
| 6,359,344 | B1|   | 3/2002  | Klein et al. ................. 290/1 A |
| 6,449,934 | B1|   | 9/2002  | Reimers et al. |
| 6,533,055 | B2|   | 3/2003  | Matsuura et al. |
| 6,543,240 | B2|   | 4/2003  | Grafton |
| 6,591,593 | B1|   | 7/2003  | Brandon et al. |
| 6,603,227 | B2|   | 8/2003  | Rose, Sr. |
| 6,604,348 | B2|   | 8/2003  | Hunt |
| 6,605,878 | B1|   | 8/2003  | Arce |
| 6,608,393 | B2| * | 8/2003  | Anderson ................... 290/1 A |
| 6,617,725 | B2|   | 9/2003  | Rose, Sr. |

(Continued)

FOREIGN PATENT DOCUMENTS

DE           10027531           1/2001

(Continued)

OTHER PUBLICATIONS

PCT International Search Report PCT/IB 03/06478.

(Continued)

*Primary Examiner*—Nicholas Ponomarenko
(74) *Attorney, Agent, or Firm*—Dinsmore & Shohl LLP

(57) ABSTRACT

A power equipment apparatus includes an internal combustion engine and a generator operatively connected to the engine, wherein the generator is configured to generate electrical power. A receptacle is configured to receive the electrical power from the generator and to provide a consumer with access to at least a portion of the electrical power.

24 Claims, 11 Drawing Sheets

U.S. PATENT DOCUMENTS

| | | |
|---|---|---|
| 6,624,533 B1 | 9/2003 | Swanson et al. |
| 6,644,004 B2 | 11/2003 | Reimers et al. |
| 6,644,272 B2 | 11/2003 | Furukawa et al. |
| 6,675,562 B2 * | 1/2004 | Lawrence ................... 56/2 |
| 6,717,281 B1 | 4/2004 | Brandon et al. |
| 6,734,647 B2 | 5/2004 | Wakitani et al. |
| 6,750,556 B2 * | 6/2004 | Sodemann et al. ......... 290/1 A |
| 6,777,846 B2 | 8/2004 | Feldner et al. |
| 6,864,606 B2 | 3/2005 | Rose, Sr. |
| 2002/0104300 A1 | 8/2002 | Hunt |
| 2004/0134175 A1 | 7/2004 | Osborne |

FOREIGN PATENT DOCUMENTS

| | | |
|---|---|---|
| EP | 1128063 | 8/2001 |
| WO | WO9728681 | 8/1997 |

OTHER PUBLICATIONS

Diesel Progress North American Edition, "A Generator That Cuts Grass", p. 63, Jan. 2002; Waukesha, Wisconsin, U.S.A.

* cited by examiner

POWER EQUIPMENT APPARATUS HAVING A POWER GENERATION SYSTEM

RELATED APPLICATION

The present application claims priority of U.S. Provisional Application Ser. No. 60/428,445 filed Nov. 22, 2002 and hereby incorporates the same Provisional Application by reference.

TECHNICAL FIELD

The present invention relates to power equipment also having an on-board power generation system. A generator can be at least partially integral with an internal combustion engine and can be configured to supply electrical power to a receptacle.

BACKGROUND OF THE INVENTION

Many varieties of power equipment are available for residential, commercial and industrial use. Examples of such power equipment include but are not limited to mowers, lawn tractors, snow blowers, tillers, ditch diggers, chainsaws, rotary saws, chippers/shredders, portable generators, and hedge trimmers. Such varieties of power equipment can be equipped with an internal combustion engine as a primary source of power to facilitate operation of the power equipment. Despite the utility offered by each variety of power equipment, many consumers can only justify purchasing a limited few pieces of power equipment due to the relatively high cost, limited use and substantial size of each such device.

Perhaps the most common variety of power equipment having an internal combustion engine is a lawn mower. In fact, a mower can typically be found within the garage or shed of many modern homes. Although mowers are available in many sizes and configurations, one type of mower is a walk-behind mower. The walk-behind mower is ideally suited for maintaining a relatively small lawn, such as that surrounding a typical home. Such a mower is typically operated for only a couple of hours per week, but otherwise often sits idle and without potential for use.

A portable generator is another variety of power equipment having an internal combustion engine. Portable generators can serve as an invaluable tool and can be quite valuable to the typical consumer under certain circumstances, particularly for activities remote from house receptacles and during emergencies during which power from the utility company is lost. For example, a homeowner can use a portable generator to operate a sump pump when power from the utility company is interrupted, thereby preventing damage from a potential flood. Despite such utility, due to the relatively high cost for such a portable generator and the relative infrequency of such emergencies, the typical consumer is often not inclined to purchase such a piece of equipment.

Accordingly, there is a need for more versatile power equipment. Furthermore, there is a need for power equipment that requires less storage space. Still further, there is a need for a mower that is more versatile. In addition, there is a need for a more economical portable generator. More particularly, there is a need for a portable generator having additional utility in order that a typical consumer could better justify its cost.

SUMMARY OF THE INVENTION

Accordingly, it is one aspect of the present invention to provide more versatile power equipment. It is another aspect of the present invention to provide power equipment requiring less storage space. Still further, it is an aspect of the present invention to provide a more versatile mower. It is another aspect to provide a more economical portable generator. It is still a further aspect to provide a portable generator having additional utility in order that a typical consumer could better justify its cost. To achieve the foregoing and other aspects, and in accordance with the purposes of the present invention defined herein, a power equipment apparatus having a generator is disclosed.

In one embodiment of the present invention, a walk-behind mower comprises a substantially non-conductive deck and an internal combustion engine adjacent to the deck. A generator is operatively connected to the engine and is at least partially integral with the engine, wherein the generator is configured to generate electrical power. An inverter is configured to receive electrical power from the generator and to condition the electrical power. A receptacle electrically coupled with the inverter is configured to provide a consumer with access to the conditioned electrical power. A mowing blade is selectively rotated by the engine, wherein the mower is configured to disengage the mowing blade when the consumer accesses the conditioned electrical power.

In another embodiment of the present invention, a power equipment apparatus comprises an internal combustion engine. A generator is operatively connected to the engine, wherein the generator is configured to generate electrical power. A receptacle is configured to receive the electrical power from the generator and to provide a consumer with access to at least a portion of the electrical power.

In still another embodiment of the present invention, a power generation system is configured for association with a power equipment apparatus. The power generation system comprises an internal combustion engine having a housing and a generator operatively connected to the engine and disposed at least partially within the housing. The generator is configured to generate electrical power and a receptacle is configured to receive the electrical power from the generator and to provide a consumer with access to at least a portion of the electrical power.

In yet another embodiment of the present invention, an internal combustion engine is configured for association with a power equipment apparatus. The engine comprises a housing at least partially containing a generator operatively connected to the engine and configured to generate electrical power for receipt by a receptacle, wherein the receptacle is configured to provide a consumer with access to at least a portion of said electrical power.

Accordingly, the present invention is advantageous for providing more versatile power equipment. Also, the present invention is advantageous for providing power equipment that requires less storage space. A further advantage of the present invention is its provision of a more versatile mower. Another advantage of the present invention is its provision of a more economical portable generator. Yet another advantage of the present invention is its provision of a portable generator having additional utility in order that a typical consumer could better justify its cost. Additional aspects, advantages, and novel features of the invention will be set forth in part in the description that follows, and in part will become apparent to those skilled in the art upon examination of the following, or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1A:
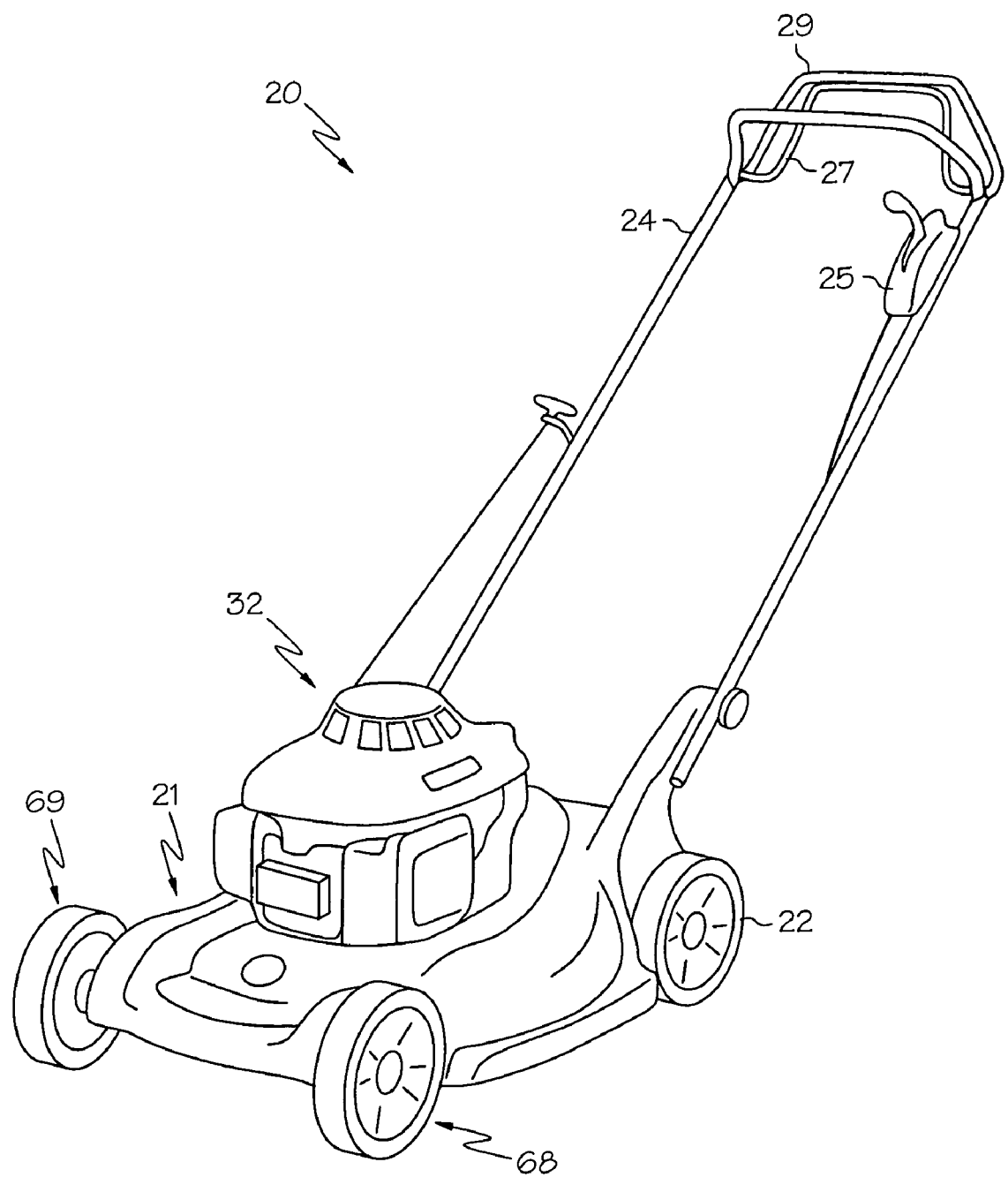
FIG. 1A is a perspective view depicting a walk-behind mower having a power generation system in accordance with one exemplary embodiment of the present invention.

The present invention and its operation is hereinafter described in detail in connection with the views and examples of the drawing figures (FIGS. 1A–B, 2A–B, 3, 4A–G, and 5A–C) wherein like numbers indicate the same or corresponding elements throughout the views. Herein, "DC" is used as an abbreviation for "Direct Current" and "VDC" is used as an abbreviation for "Volts Direct Current". Similarly, "AC" is used as an abbreviation for "Alternating Current" and "VAC" is used as an abbreviation for "Volts Alternating Current". AC, as used herein, shall not be limited to AC having a true sinusoidal waveform, but shall also include AC waveforms having a simulated sinusoidal waveform including, for example, those generated through pulse width modulation (as described in further depth hereinafter).

As shown in FIG. 1A and as generally known, a walk-behind mower 20 can be configured to mow grass with a rotating blade. The walk-behind mower 20 of this example is shown with a handle 24 connected to a deck 21. Handle 24 can be configured to enable an operator to push, pull or otherwise maintain control of deck 21 and can be connected to the rear of deck 21 (as shown in FIG. 1, for example). Alternatively, handle 24 might be connected to another portion of deck 21, such as near the center of deck 21. Regardless of where handle 24 connects with deck 21, handle 24 can either be fixed in a single orientation with respect to deck 24 or alternatively, can be movable with respect to deck 21. In some embodiments, handle 24 might be collapsible or foldable for easy storage of the walk-behind mower 20 by a consumer. In still other embodiments, handle 24 can be selectively removable from deck 21 by a consumer.

Handle 24 can be configured to support one or more electrical or mechanical controls of walk-behind mower 20. For example, handle 24 can support a safety lever 29 and a drive lever 27. Safety lever 29 can be configured to enable an operator to selectively enable/disable rotation of the mowing blade(s). This disablement can result from engine 32 ceasing rotation or from disengagement of engine 32 from the blade, such as through an electrical and/or mechanical clutch, for example. Drive lever 27 can be configured, for example, to enable propulsion of the mower, such as by causing rotation of one or more of the mower's drive wheels (e.g., 22, 23). In addition to safety lever 29 and drive lever 27, handle 24 can be further configured to support any other operator controls associated with mower 20. Examples of such controls include, but are not limited to, choke and throttle levers, start/stop switches and/or push-buttons, deck-height adjustments, travel speed adjustments, illumination controls, indicator lamps, warning devices or horns, gauges, hour-meters, and/or other control devices. Also, in some embodiments, handle 24 can be configured to support one or more power receptacles for access by a consumer.

Deck 21 can be formed from any of a variety of suitable materials including but not limited to steel, aluminum, plastics (e.g., XENOY® material such as available from General Electric Company, Fairfield, Conn.), fiberglass, composites, and combinations thereof. A plastic deck can have a lighter weight, be simpler and less expensive to manufacture, and have an increased impact resistance as compared to a metal deck. Also, a plastic deck can be easily configured (e.g., by molding) to incorporate complex mounting structures for receiving associated equipment. In addition, a plastic deck can have a relatively high electrical resistance, therefore rendering it a poor conductor of electricity.

Figure 1B:
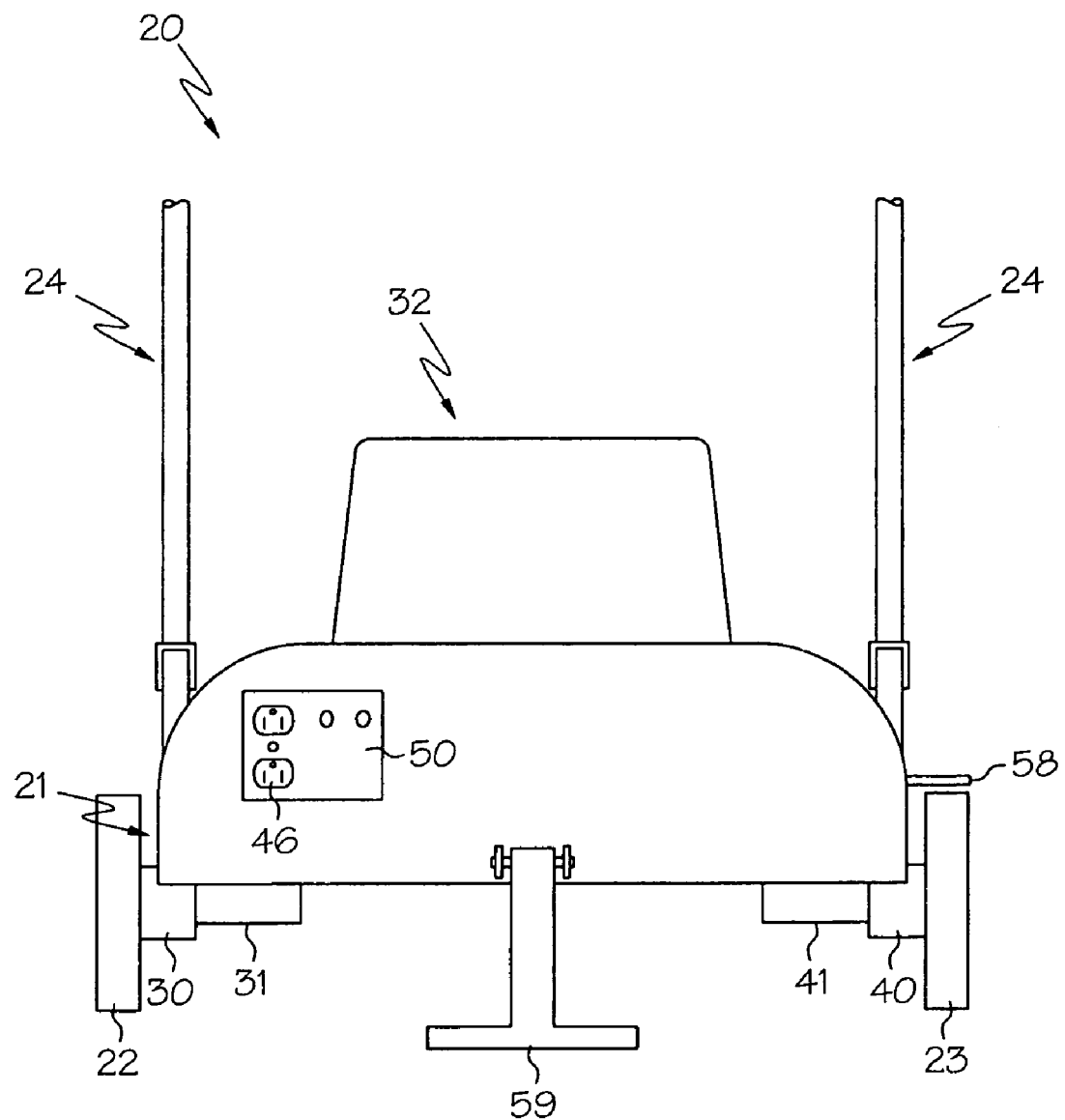
FIG. 1B is a rear elevational view depicting the walk-behind mower of FIG. 1.

Deck 21 can be movably supported from the ground by one or more wheels. In an exemplary embodiment, as depicted in FIGS. 1A and 1B for example, deck 21 can be supported by two front wheels 68, 69 and two rear wheels 22, 23. The height and/or size of these wheels with respect to the deck might be adjustable in order to facilitate selection of the desired cutting height for the lawn. In one embodiment, none of the wheels might be operatively coupled to an engine, motor or other actuator (e.g., the mower is a "push-type mower"). In another embodiment, one or more of the wheels can be operatively coupled to an engine and/or to one or more electric motors, drive devices or actuators so as to cause rotation of the wheel(s). By causing driven rotation of the wheel(s) in this manner, deck 21 can be propelled along the ground (e.g., the mower is "self-propelled"). A belt, tape, chain, gearbox, transmission, and/or other power transmission device can be employed to operatively couple the one or more wheels to the engine, motor(s), drives or actuator(s).

In one exemplary embodiment, as depicted by FIG. 1B, left rear wheel 22 can be driven by an electric motor 31 connected to left rear wheel 22 via a gearbox 30. Right rear wheel 23 might also be driven by an electric motor 41 operatively coupled to right rear wheel 23 with a gearbox 40, for example. In another embodiment, only one rear wheel might be driven by an electric motor. In either embodiment (not shown), the electric motor can optionally interface the rear wheel without a gearbox, such as when the motor's shaft is directly coupled to the wheel. Alternatively, a motor can interface a wheel with a belt, drive tape, chain or other power transmission device. In still another alternative, both rear wheels 22, 23 can be driven by the same electric motor, such as when a drive shaft (not shown) connects both rear wheels 22, 23 to the motor. Any of a variety of power transmission devices could be used to selectively drivingly interface the electric motor with such a drive shaft including, for example, a gear box or transmission. It should also be understood that hydraulic motors can be used in place of electric motors in any of the aforementioned configurations. Hydraulic motors can receive power from an electrically or mechanically operated hydraulic pump, for example. In yet another embodiment, one or both rear wheels 22, 23 can be driven by a mechanical connection (e.g., power transmission device such as a belt, tape, chain, or gearbox) to the engine, as is common in many conventional "self-propelled" type mowers. In any event, when an engine, motor or other actuator causes a rear wheel to rotate, the mower 20 can be resultantly propelled along the ground.

Regardless of whether any wheels are coupled to an engine, motor or actuator, a power equipment apparatus such as mower 20 can incorporate one or more immobilizing devices selectively configured to prevent an associated mower from unintentionally moving (e.g., when not mowing grass). Such an immobilizing device might include one or more wheel locks (e.g., 58 of FIG. 1B) and/or parking brakes configured to prevent rotation of one or more of the wheels. In another embodiment and/or in addition to wheel locks, an immobilizing device could include one or more jacks (e.g., 59) or outriggers configured to effectively disengage or suspend one or more of the wheels from the ground and to thereby prevent deck 21 from readily moving upon the ground. Immobilizing devices can be particularly useful to prevent a mower with a running engine from moving while unattended, for example.

A power apparatus such as mower 20 can be configured to support virtually any combination of components and/or accessories related to its operation. For example, deck 21 might support a battery, interface circuitry 50, and a receptacle 46. More particularly, as illustrated in the example of FIG. 1B, receptacle 46 might be conveniently mounted on a rear surface of deck 21 so as to be easily accessible to a consumer. As depicted in FIG. 1B, interface circuitry 50 can be integrally housed with receptacle 46, although such integration is certainly not critical. Certain operator controls (e.g., wheel height adjustments) might also be associated with deck 21 instead of or in addition to being associated with handle 24.

In addition, mower 20 comprises an internal combustion engine 32, which is shown in the examples of FIGS. 1A and 1B as being mounted adjacent the upper surface of deck 21. Engine 32 can be configured to convert fuel into mechanical and/or electrical energy. In one exemplary embodiment of the present invention, engine 32 can be configured to use gasoline, however, in other exemplary embodiments, engine 32 can equally be configured to consume diesel fuel, liquid propane, fuel oil, natural gas, alcohol, kerosene, and/or another suitable fuel.

Engine 32 can provide sufficient power to rotate a generator 34. In one embodiment, a generator can be provided at least partially integrally with an engine. It is to be understood that for such integral applications, an engine/generator can include any combination of engine and generator components that conserves size and/or weight by eliminating the need for certain duplicative mechanical structures that would otherwise be necessary if an engine and generator having similar power production capabilities were provided separately and coupled together. For example, in the exemplary embodiment depicted in FIG. 2A, for example, a generator 34 is depicted as being integral with engine 32. In this example, a fan 66 and a rotor 64 can together fulfill the function normally served by the flywheel of certain conventional internal combustion engines. When assembled, a cover (not shown) substantially conceals fan 66 and rotor 64 from view and contact by an operator. However, the combination of rotor 64 with coil assembly 60 forms generator 34 (e.g., the coil assembly serves as a stator) integrally with engine 32. More specifically, in this example rotor 64 might be configured to incorporate permanent magnets (e.g., 62) or other magnetic flux-inducing elements. Coil assembly 60 (including a plurality of windings of electrical wire) can be disposed adjacent to and in a fixed position (e.g., against the engine block) relative to rotor 64. In operation, coil assembly 60 can experience the magnetic field developed by the magnets (e.g., 62) and can convert this magnetic field into electrical power for transmission through cable 38 to other components of mower 20. By integrating generator 34 with engine 32, a compact and light-weight engine/generator arrangement can be achieved at a significantly reduced cost as compared to the combination of separate engine and generator components or assemblies. In one embodiment, engine 32 can have a similar engine/generator structure to that present in the relatively conventional model EU1000i portable generator (currently manufactured and sold commercially by Honda Power Equipment Group of Alpharetta, Ga.). Power equipment incorporating an integral engine/generator arrangement can generally require fewer components (or at least fewer redundancies) and might resultantly be more compact and/or lighter than embodiments incorporating a separate engine and generator.

It can sometimes be important to regulate an engine's speed when the engine is coupled to a generator. For example, in certain power generation systems (e.g., those not including inverters), the voltage and frequency of the generated electrical power can vary substantially as the rotational speed of the generator is altered. Accordingly, in order to ensure that the receptacle receives proper and consistent electrical power from the generator, such a power generation system might include one or more devices to regulate the engine's speed, such as to maintain the generator's speed in a predetermined operating range. In other power generation systems, an inverter can be connected to the output of a generator and can condition the electrical power from the generator such that the proper voltage and frequency are consistently provided (even during engine/generator speed fluctuations). However, when an inverter is so implemented, it may still be desirable to uniformly regulate the engine/generator speed in order to achieve the maximum power, efficiency, and/or operational life of the engine and/or generator. Hence, for these and other reasons, it can be desirable to regulate an engine's speed when the engine is coupled to a generator, as discussed further below.

When utilizing the power equipment for other purposes, such as mowing grass in the lawn mower application, precise engine speed regulation is not as important because many such operations (e.g., grass-mowing) can be largely insensitive to mild speed fluctuations. Also, in many instances, it might be desirable to operate an engine as fast as possible when mowing (e.g., to achieve a better cut). Accordingly, it might be desirable for an engine to operate at a lower speed when generating electricity than when mowing lawns. Hence, when integrating a generator with an engine, as shown in detail in FIG. 2A, for example, electrical or mechanical controls might be provided so as to regulate the speed of the engine during power generation. Such controls might involve a manual throttle lever, whereby a user can manually adjust the throttle to provide greater speed when mowing the lawn as compared to when generating electricity. Alternatively, such controls might involve an automatic throttle adjustment, including, for example, a type of mechanical governor device. Such a mechanical governor device can adjust the speed of the engine when an associated generator is generating electrical power. In still a further embodiment, such controls might involve electronic speed regulation wherein circuitry monitors the shaft speed or another characteristic of the engine and adjusts the speed of the engine in accordance with a predetermined program. In any event, when the same engine is implemented to operate both a generator and a mowing blade, a speed regulation system might be implemented so as to appropriately regulate the engine speed (and resultant horsepower generated) during each of the available operations of the engine. This speed regulation system might be coupled with or integral with the generator, the engine, an inverter, control circuitry, interface circuitry and/or any of the other devices or structures present on the mower.

Figure 2A:
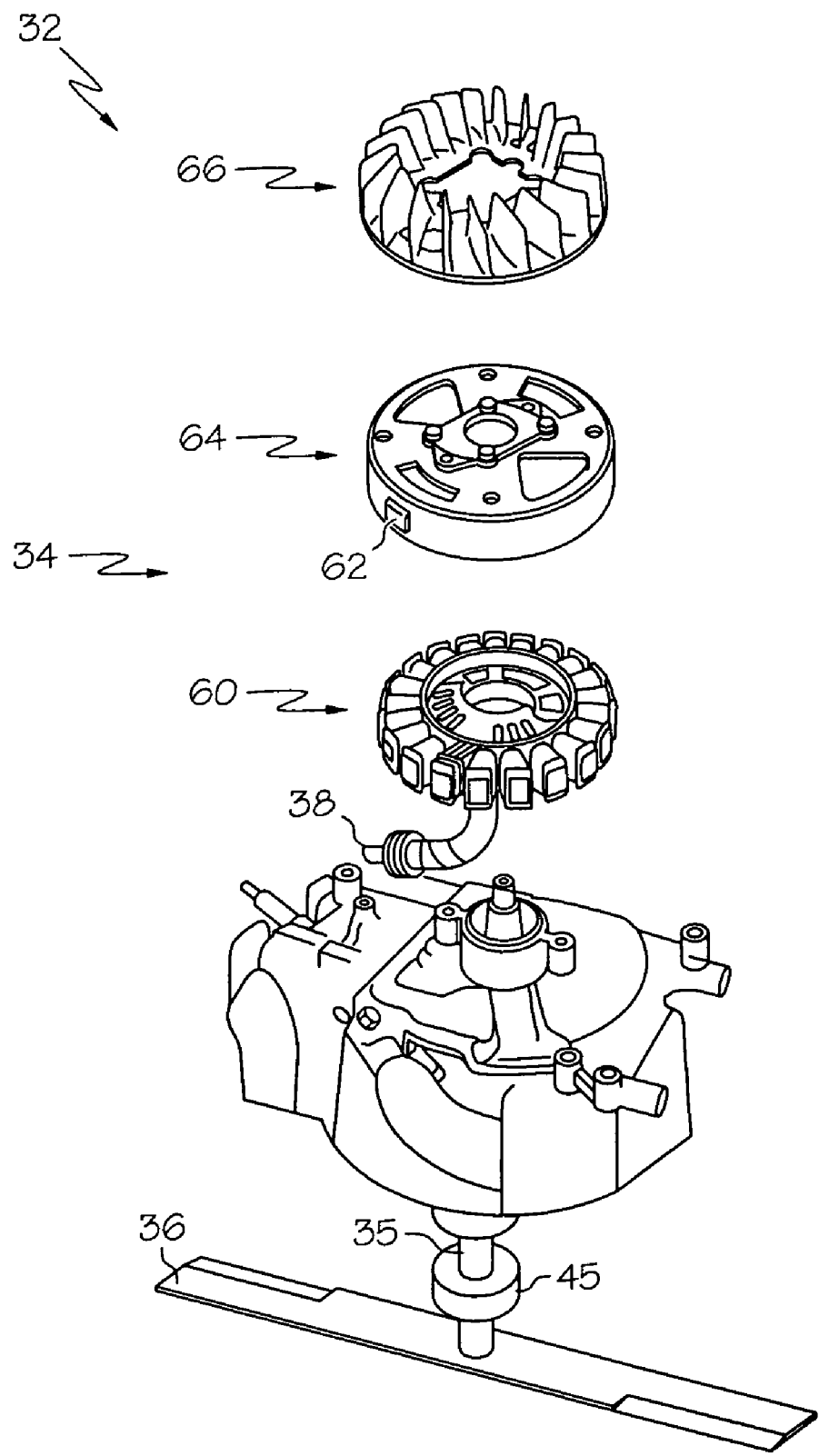
FIG. 2A is a partially exploded perspective view of an internal combustion engine having an integral generator in accordance with one exemplary embodiment of the present invention.

In addition to powering generator 34, engine 32 in this lawn mower illustration can also be configured to provide power for rotating at least one mowing blade. In one embodiment, as depicted by FIG. 2A for example, crankshaft 35 can support at least one mowing blade 36. A clutch 45, tensioning device, or other disconnecting device might interface engine 32 to blade 36 in order that engine 32 may also be selectively operated without rotating the blade 36. Clutch 45 can be configured to selectively engage and/or disengage crankshaft 35 from blade 36 in response to an electrical or mechanical (e.g., hydraulic) activation. Such an activation could be provided manually by an operator of the mower (e.g., such as with a control device on handle 24) or could be provided automatically by electrical circuitry or a mechanical device associated with the mower.

Figure 2B:
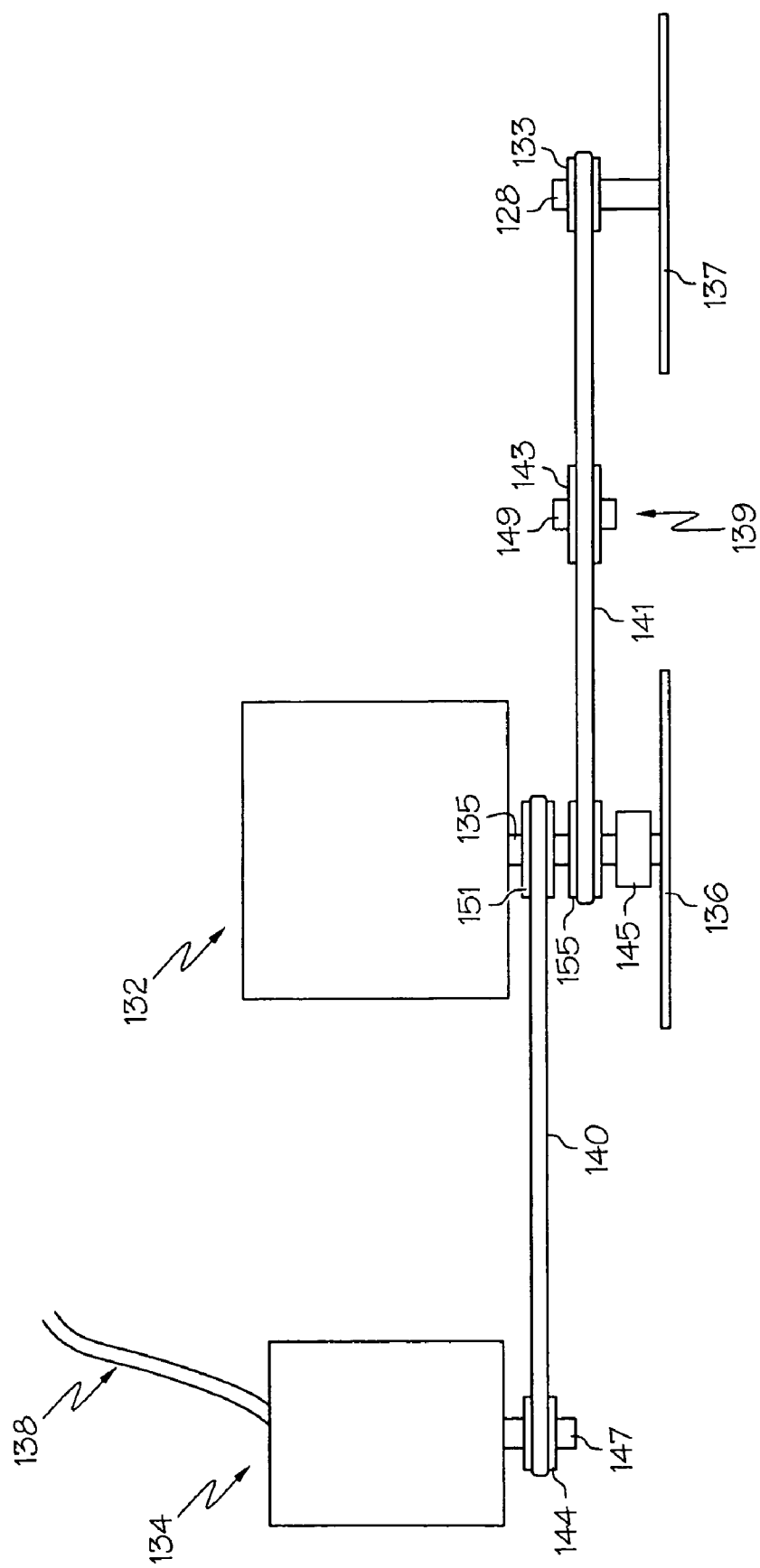
FIG. 2B is a partial side view of an internal combustion engine coupled with a separate generator in accordance with another exemplary embodiment of the present invention.

In an alternate embodiment depicted by FIG. 2B, an engine 132 can be operatively coupled to a separate generator 134, wherein generator 134 can be configured to provide electrical energy through cable 138. This operative coupling can, for example, occur through a belt 140 connecting a pulley 151 on engine shaft 135 to a pulley 144 on generator shaft 147, for example. In other embodiments, a chain, drive tape, hydraulic coupling, gearbox, transmission, drive shaft, coupler, sprocket or another suitable mechanical interface can operatively couple engine 132 to generator 134.

Engine 132 might also be configured to provide mechanical power to one or more mowing blades. For example, at least one blade 136 might be mechanically supported by engine shaft 135 through a coupling. This coupling might involve an electrical or mechanical (e.g., fluid-type) clutch 145 configured to selectively engage/disengage blade 136 from engine shaft 135. In such a configuration, by properly selecting the relative diameters of pulleys 144 and 151 (or by otherwise configuring the operative coupling between engine 132 and generator 134) the engine shaft 135 can be configured to rotate at one speed (e.g., an optimum operational speed for engine 132) while the generator shaft 147 rotates at a different speed (e.g., an optimum operational speed for generator 134). As another example, a torque converter (not shown) can operatively couple engine 132 to generator 134.

In one embodiment, engine 132 might be configured to operate a remote blade (e.g., 137) in lieu of a shaft-supported blade (e.g., 136). However, as depicted by FIG. 2B, engine 132 can be configured to concurrently operate more than one blade. In one such embodiment, one or more blade (e.g., 136) can be supported by engine shaft 135 while one or more additional blades (e.g., 137) can be operatively connected to engine shaft 135 with belts (e.g., 141), chains, pulleys, tapes, gears and/or other power transmission devices. For example, a belt 141 can connect a pulley 155 on engine shaft 135 to a pulley 133 on spindle 128, wherein spindle 128 is coupled to remote blade 137. In other embodiments, a chain, drive shaft, gearbox, transmission, coupler, sprocket or another suitable mechanical interface can operatively couple engine 132 to remote blade 137. A clutch, selective tensioning or engagement arrangement, or another disconnecting device might be configured to selectively disengage engine shaft 135 from remote blade 137. For example, as depicted in FIG. 2B, tensioner 139 might comprise a pulley 143 coupled to a moveable spindle 149, wherein moveable spindle 149 can be moved in order to adjust the tension on belt 141 to selectively enable/disable the rotation of remote blade 137. In alternate embodiments, tensioner 139 can be replaced with an electrical or mechanical clutch, for example, or another such interface device capable of disconnecting remote blade 137 from engine shaft 135. By implementing clutches (e.g., 145) and/or tensioners (e.g., 139) as described, engine 132 can be configured to operate generator 134 without rotating any mowing blades (e.g., 136 and 137).

In still another embodiment, one or more blades can be driven by an electric motor. This electric motor can, for example, be configured to receive electrical power (e.g., as an accessory) from a generator driven by the engine. In such an embodiment, the blade will coast to a stop when power is removed from the electric motor. However, to expedite stopping of the blade, the motor leads (after power is removed) can be electrically shorted together or can be connected across a suitable braking resistor.

For certain conventional mowers, stopping the engine (e.g., by releasing a handle-mounted safety lever 29) can often be the only effective manner for an operator to stop rotation of the mowing blade. It is therefore simple to discern whether the blade on such a mower is rotating by whether the engine is running. However, in accordance with the present invention, wherein the engine can be configured to operate without rotation of the blade, it might in some embodiments prove beneficial to provide an operator with some affirmative indication as to whether the blade is rotating. Although a mower might produce a discernable higher level of noise when the blade is rotating as opposed to when the engine alone is operating, some embodiments of the present invention might also include an electrical or mechanical indication of the blade's rotational status. For example, an indicator light can be associated with the control box 25 on handle 24, for example, to indicate when the blade is or is not rotating. The indicator light can receive a signal, for example, from a sensor (e.g., a Hall Effect or proximity sensor) associated with the blade.

The power equipment apparatus might also include a mechanical blade locking device (not shown). This blade locking device might comprise a lever, pin, shaft, or other mechanical device configured to positively interfere with the rotation of the mowing blade and that can accordingly, when engaged, ensure that the mowing blade cannot rotate. In one embodiment, this blade locking device might only be capable of engagement by an operator if the blade has stopped. For example, an electrical sensor can detect when the blade is stopped and can cause the activation of an electrical solenoid coupled to the blade locking device. When the electrical solenoid is activated, the blade locking device can be available for engagement by an operator. An operator can then engage the blade locking device to positively and mechanically prevent rotation of the mowing blade. Alternatively, when the electrical solenoid is activated, the blade locking device might automatically engage. In one embodiment, the generator can be configured not to produce electrical power unless the blade locking device is detected to have been engaged.

In one exemplary embodiment of the present invention, a mower could also be configured to rotate its mowing blade while simultaneously dispensing electrical power from an associated receptacle. For example, an operator of such a mower might be mowing a lawn while simultaneously using power from the receptacle to power a light source and/or a radio. In such an embodiment, the mower may incorporate a safety lever (e.g., 29 in FIG. 1A). In a first configuration, the safety lever, when released by the operator, might be configured to stop the engine. In this manner, if the operator's hand is removed from the safety lever, the engine stops, thereby ceasing power generation and blade rotation. Hence, in this configuration, the mower can only operate (either as a mower or generator) if the operator's hand remains on the safety lever. In a second configuration, the safety lever can operate to disengage the blade from the engine but to otherwise enable continued operation of the engine. In this manner, the mower can mow grass when an operator's hand engages the safety lever, but can otherwise operate as a generator (with an immobilized blade) when the operator does not engage the safety lever.

However, in an alternate embodiment of the present invention, an exemplary mower can be configured such that it cannot rotate its mowing blade while simultaneously dispensing power from an associated receptacle. For example, such a mower can be configured with an interlock system to prevent an operator from accessing power at the receptacle while the mower is rotating its blade. Such an interlock system can be implemented in a number of different manners. As one example of an interlock system, exemplary control circuitry can disengage an electromechanical clutch between the engine and the mowing blade when an operator indicates an intention to access the receptacle. Such an intention can be indicated by activation of an electrical switch by an operator, for example. The electrical switch might be a toggle switch or pushbutton disposed upon the deck or adjacent to the handle of the mower, and can be configured for engagement by the finger or hand of an operator. Alternatively, the switch might be integrated with a receptacle cover and can be configured to detect when the receptacle cover is opened. In still another embodiment, the switch can be integral with the receptacle and can be configured to detect the insertion of a plug by a consumer into the receptacle. In this manner, upon such detection by the switch, the blade can be stopped from rotating even though the engine continues to operate the generator which provides power to the receptacle. In still another embodiment of the present invention, an exemplary mower can be configured such that one or more wheels cannot rotate while power is dispensed from an associated receptacle.

In still another embodiment of an interlock system having a blade-rotation sensor, electrical power can be prevented from reaching the receptacle unless the blade rotation sensor indicates that the blade is not rotating. In still another embodiment having an immobilization device, blade rotation can be prevented when the immobilization device is activated. Also, the mower might be configured such that power will not pass to the receptacle unless the immobilization device and/or the blade locking device is activated. In an embodiment having a mechanical clutch coupling the blade to the engine, an interlock system might comprise a sensor present upon the mechanical clutch, wherein electrical power would not be permitted to pass to the receptacle unless the sensor indicates that the mechanical clutch has disengaged the blade from the engine, and the blade and wheels have been immobilized.

In one embodiment, as previously indicated, an exemplary mower 20 in accordance with the present invention can be configured to prevent the simultaneous mowing of grass and provision of electrical power to a receptacle. When an operator intends to mow grass, the operator can engage a safety lever on the handle of mower 20, disengage any mechanical blade-rotation interlocks, engage any coupling between the engine shaft and the blade, and start the engine. Before moving mower 20, any immobilizing devices should be disengaged. A drive lever can then be engaged to activate any power-propulsion capabilities of mower 20.

When an operator then elects to employ mower 20 (with an already running engine, for example) to provide electrical power from its receptacle, the operator can first cause the blade to become disengaged from the engine shaft (e.g., by causing an interfacing clutch to disengage). Next, after the blade has been effectively disengaged and has stopped rotating, and the stoppage has been verified, a mechanical blade interlock (e.g., a pin) can be engaged in order to positively prevent further rotation of the blade. When it is verified that the mechanical blade interlock is engaged, mower 20 can then enable electrical power to be dispensed from the receptacle. In some embodiments, one or more immobilization devices must also be engaged before electrical power can be dispensed from the receptacle, thus preventing mower 20 from being moved while it is providing electrical power from the receptacle. In one embodiment, it might be required for an operator to stop and restart the engine when switching between mowing and power generation modes of mower 20.

Figure 3:
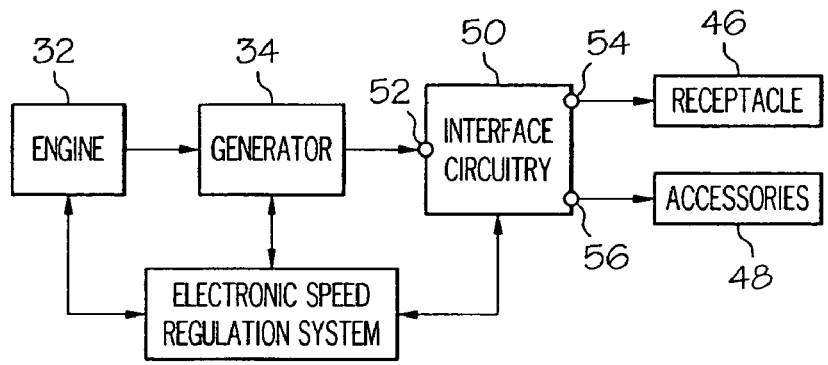
FIG. 3 is a block diagram schematically depicting a power generation system in accordance with one exemplary embodiment of the present invention.

Turning to the illustrative schematic of FIG. 3, electrical power generated by the generator 34 can be fed into interface circuitry 50 through a power input port 52. Interface circuitry 50 can be configured to provide electrical power through an accessory port 56 to one or more electrical accessories 48 on the mower. Examples of accessories 48 might include an electronic ignition module, lamps (e.g., headlights), actuators, motors, and/or other devices. Accessories 48 might further include a cigarette lighter or other socket configured to provide power (e.g., 12 VDC) to consumer appliances (e.g., searchlights, music devices, telephones, or the like). Such accessories can typically be configured to operate on about 12 VDC, for example, and in many cases could not operate continuously during operation of the mower if a generator were not associated with the engine (e.g., because an associated battery would be drained after a limited period of accessory operation). In this manner, the presence of a power generation system on a walk-behind mower enables the incorporation of accessories that would otherwise be unavailable for use upon the walk-behind mower.

In addition, interface circuitry 50 can be configured to output power to one or more receptacles 46 through a receptacle port 54. A receptacle 46 can be generally configured to enable a consumer to access electrical power. Although receptacle 46 could comprise virtually any type of electrical connector, in an exemplary embodiment, receptacle 46 comprises a duplex receptacle such as that commonly found within residential homes and commercial buildings. More specifically, receptacle 46 can comprise a ground fault circuit interrupter (GFCI) receptacle. Receptacle 46 can be configured to provide between about 110 VAC and about 130 VAC and more particularly can be configured to provide about 120 VAC. Power from receptacle 46 can be used by a consumer to power sump pumps, fans, radios, refrigerators, portable heaters or air conditioners, dehumidifiers, furnace blowers, power tools, lamps, and many other consumer appliances, for example. In alternate embodiments of the present invention, receptacle 46 can be configured to selectively provide about 12 VDC, about 24 VAC, between about 220 VAC and about 240 VAC, between about 440 VAC and about 480 VAC, and/or any other voltage capable of use by a consumer. Still furthermore, receptacle 46 can be configured to selectively provide virtually any amount of current including, for example, about 15 to about 20 Amperes. In addition, receptacle 46 could be configured to provide more than one circuit, wherein each circuit may have similar or different voltage and/or current characteristics. In still other embodiments, receptacle 46 might include a plurality of receptacles wherein each receptacle can be configured to provide electrical power for use by a consumer.

Figure 4A:
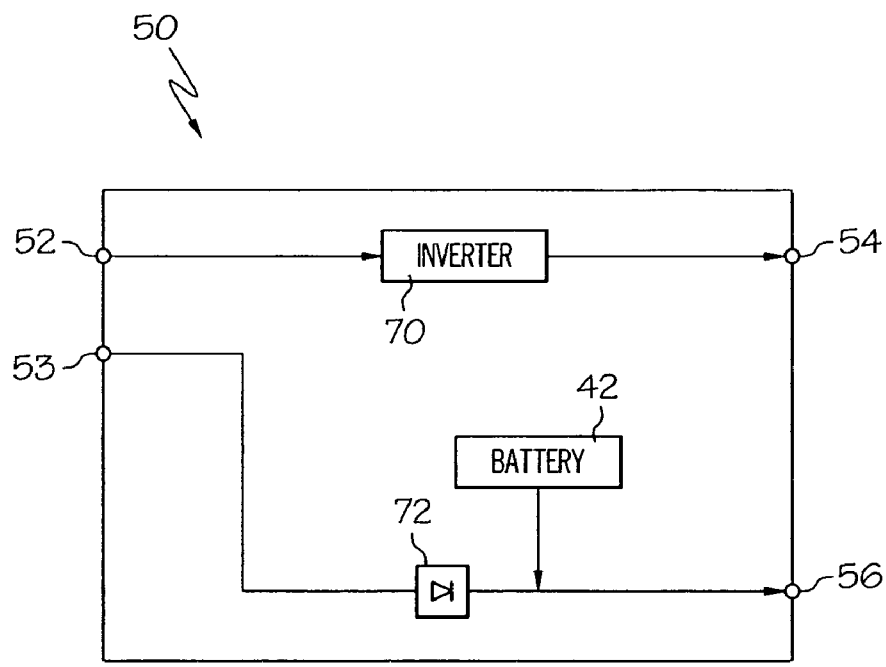
FIG. 4A is a block diagram schematically depicting exemplary interface circuitry in accordance with one illustrative embodiment of the present invention.

Interface circuitry 50 can be further configured to process or otherwise condition the electrical power received from the generator before dispensing this electrical power to accessories and/or to a receptacle. For example, in one exemplary embodiment, as depicted by FIG. 4A, interface circuitry 50 includes a first power input port 52 configured to receive unconditioned high voltage power (e.g., ranging from 120 VAC to 150 VAC) from the generator. Interface circuitry 50 can further include a second power input port 53 configured to receive a low voltage power (e.g., 14 VAC). In this embodiment, the high voltage power received through first input port 52 can be fed through an inverter 70 (shown in further detail in FIG. 5A and hereinafter further described below) to receptacle port 54. In this same embodiment, the low voltage power received at second electrical port 53 from a second output of the generator can be rectified by a diode module 72 and/or conditioned by a voltage regulator (not shown) before being output to accessories through an accessory port 56 (e.g., as 12 VDC). As used herein, a diode module might include one or more diodes configured to rectify AC into DC and might comprise, for example, a half-wave rectifier or a full-wave bridge rectifier. In one embodiment, interface circuitry 50 might include a battery 42 connected to the output of diode module 72. In this manner, battery 42 can be recharged by power from the generator but can also be configured to provide electrical power to the accessories in excess of that capable of being provided by the generator.

Figure 5A:
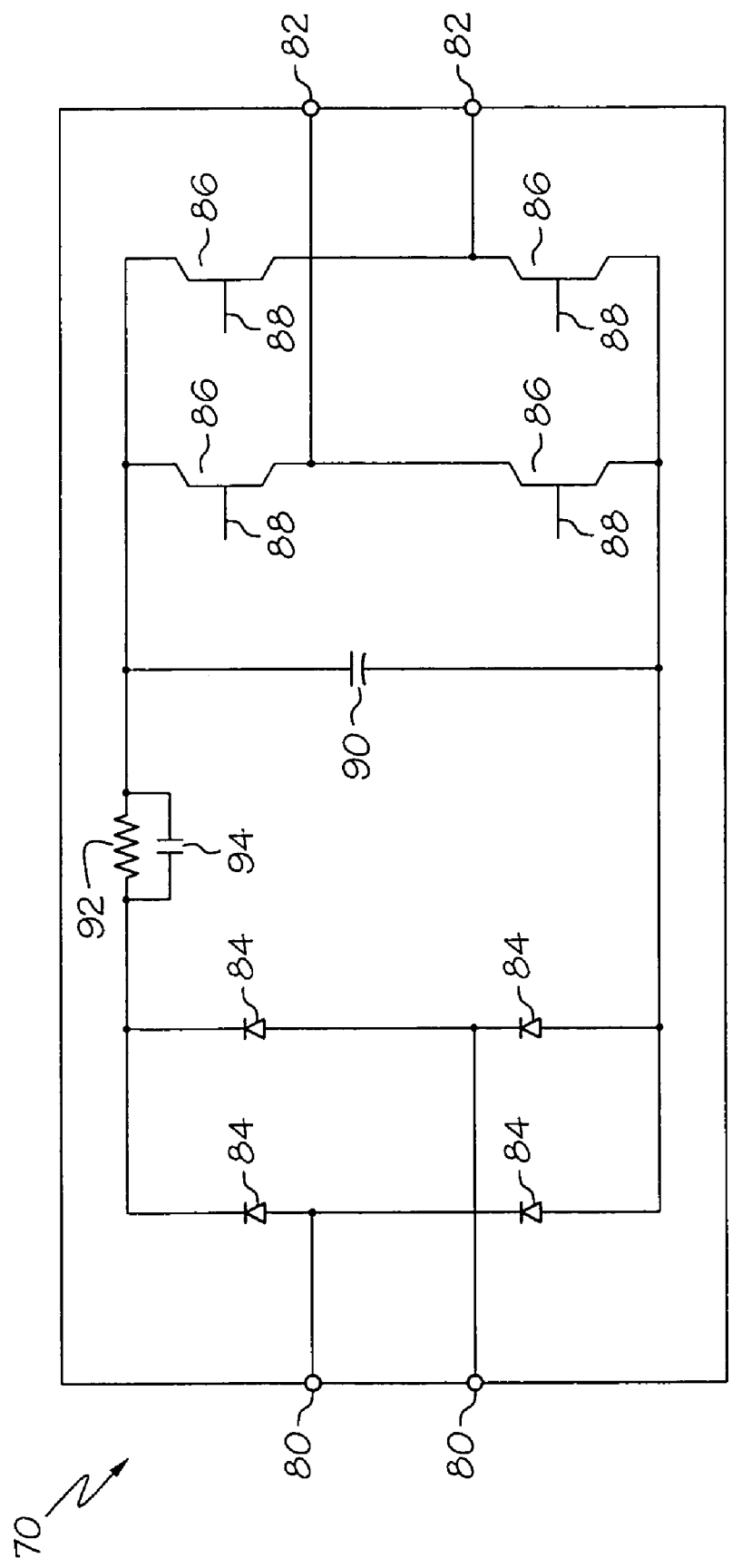
FIG. 5A is a simplified schematic view depicting a portion of an inverter in accordance with one exemplary embodiment of the present invention.

In one embodiment, inverter 70 can be configured to convert unregulated AC into DC, and then to convert the DC into regulated AC. In this manner, inverter 70 can provide a constant and regulated power supply at its output terminals. More specifically, as depicted by FIG. 5A, inverter 70 can include power input terminals 80 that might be configured to receive either AC or DC from a power supply, such as a generator of the present invention. The power received at power input terminals 80 passes through diodes 84, which in one embodiment might comprise a bridge rectifier that can convert all power entering through power input terminals 80 to DC. After being converted to DC, a soft charge resistor 92 might optionally be connected in-line between diodes 84 and capacitor bank 90. Resistor 92 can help to ensure that capacitor bank 90 does not demand excessive current when initially charging. Once capacitor bank 90 is charged, a contactor 94 can close, thereby effectively removing resistor 92 from the circuit. Capacitor bank 90 helps to ensure that the DC created by diodes 84 is sufficiently clean (e.g., having a ripple factor sufficiently low to facilitate effective pulse width modulation). This DC can then be switched using transistors 86 to generate a pulse width modulated output signal (e.g., a simulated sine wave) for transmission through power output terminals 82.

Although not shown, a microprocessor or other controller can control the switching of transistors 86 by connection to gates and/or bases 88 of transistors 86. Such switching can be closely regulated by such controller or microprocessor by monitoring the input voltage, DC voltage, and/or output voltage of inverter 70, for example. By increasing the "on" time of the transistors, the controller increases the amount of voltage generated at the output power terminals 82. In this manner, if 120 VAC is applied to power input terminals 80 of inverter 70, transistors 86 can be switched on and off such that the power leaving inverter 70 through power output terminals 82 can be precisely regulated at any selected value between 0 volts and 120 volts, AC or DC, for example.

Figure 4B:
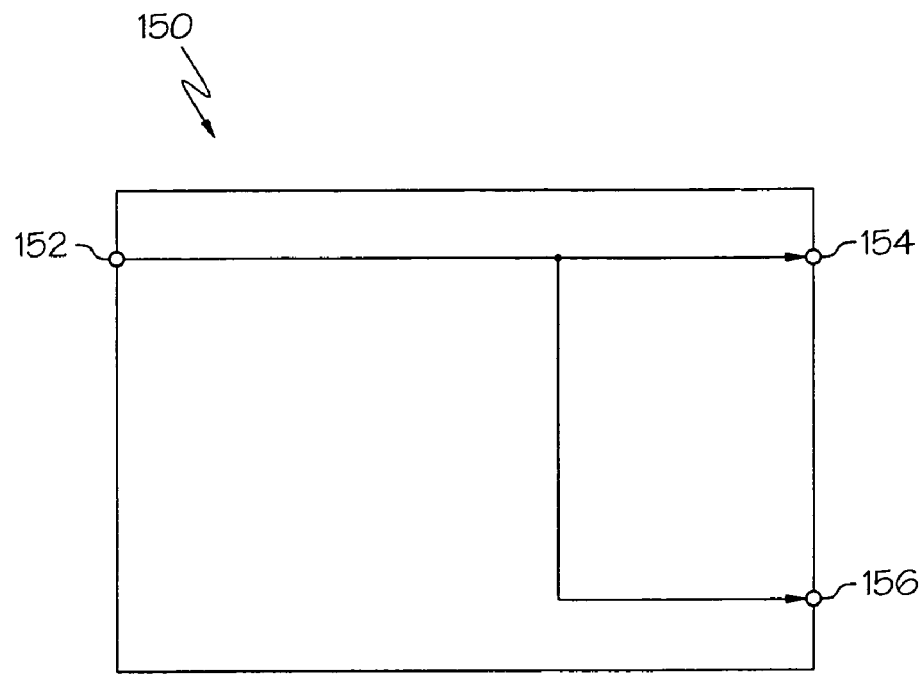
FIG. 4B is a block diagram schematically depicting exemplary interface circuitry in accordance with another illustrative embodiment of the present invention.

Another exemplary embodiment of interface circuitry 150 is depicted by FIG. 4B wherein interface circuitry 150 is shown to comprise a single power input port 152 directly coupled to a receptacle port 154 and an accessory port 156. Such a configuration could be particularly useful when the electrical power received at power input port 152 does not require further conditioning before being output to a receptacle and to accessories. This configuration might also be appropriate when each of the accessories connected to accessory port 156 is configured to receive 120 VAC.

Figure 4C:
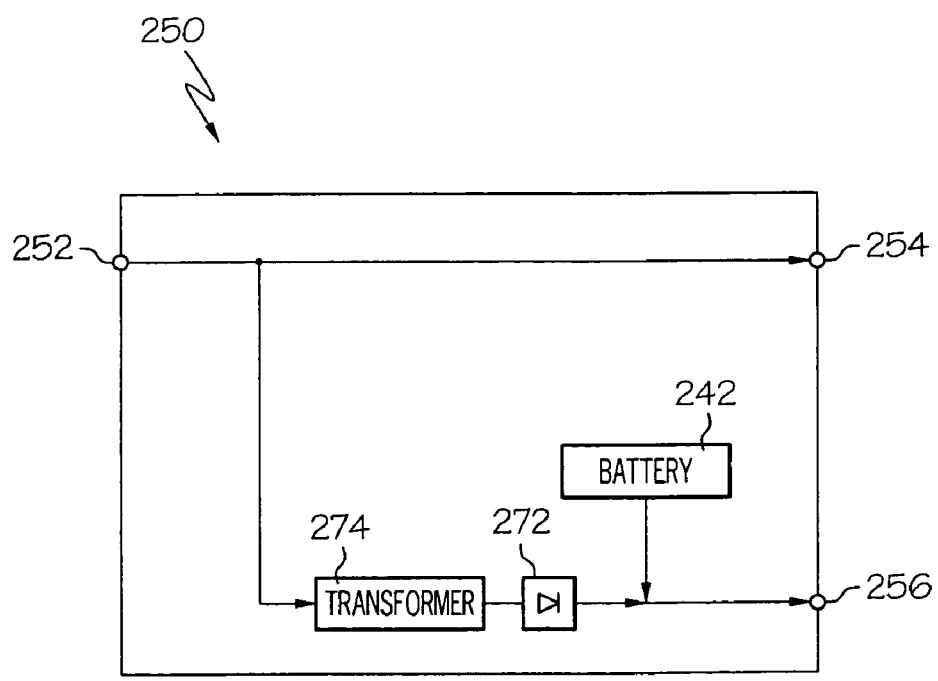
FIG. 4C is a block diagram schematically depicting exemplary interface circuitry in accordance with yet another illustrative embodiment of the present invention.

In yet another embodiment of the present invention as depicted by FIG. 4C, interface circuitry 250 can comprise a power input port 252 configured to receive approximately 120 VAC from the generator. Part of the power received at power input port 252 can be passed directly to receptacle port 254 for dispensation to a consumer at an attached receptacle. Such a configuration could be particularly useful when the electrical power received at power input port 252 does not require further conditioning before being output to a receptacle and to accessories. However, another portion of the power received at power input port 252 can be passed through a step-down transformer 274 and then through a diode module 272. After passing through diode module 272, the power can, for example, measure approximately 12 VDC and can be output through accessory port 256 for reception by one or more attached accessories. A battery 242 can also be connected to the output of diode module 272.

Figure 4D:
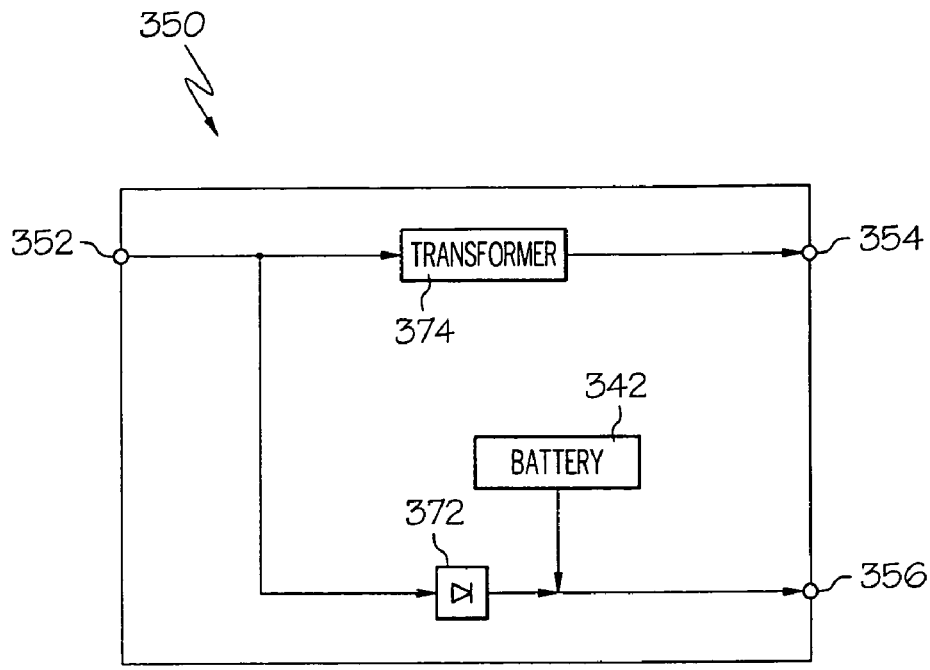
FIG. 4D is a block diagram schematically depicting exemplary interface circuitry in accordance with still another illustrative embodiment of the present invention.

In still another embodiment, as depicted by FIG. 4D, interface circuitry 350 can be configured to receive approximately 14 VAC on power input port 352. A portion of this input power can be increased to approximately 120 VAC with a transformer 374, for example, before being output from receptacle port 354. In addition, a portion of the electrical power input at power input port 352 can be rectified with a diode module 372 before being output accessory port 356 as 12 VDC. In addition, a battery 342 can be connected to the output of diode module 372.

Figure 4E:
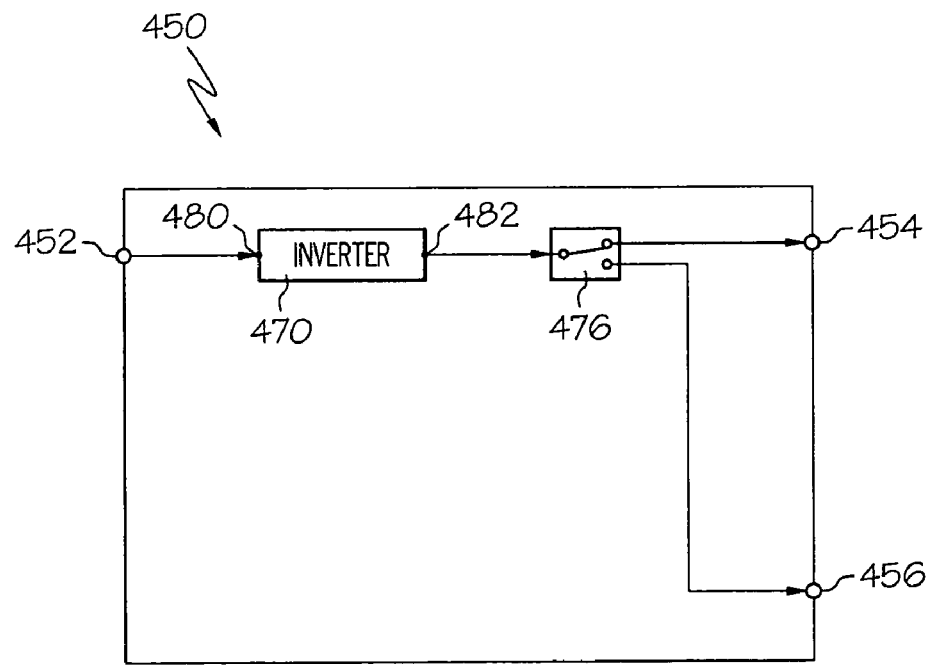
FIG. 4E is a block diagram schematically depicting exemplary interface circuitry in accordance with another illustrative embodiment of the present invention.

In still further exemplary embodiments of the present invention, as depicted by FIG. 4E, interface circuitry 450 can be configured to receive between about 120 VAC and 180 VAC at power input port 452. This power can be passed into power input terminals 480 of an inverter 470 (inverter 470 can be similar to previously described inverter 70, for example) and from power output terminals 482 of inverter 470 into a switch 476. The switch can, for example, comprise a relay, a contactor, a manual switch and/or a semiconductor switch (e.g., a transistor). In an exemplary embodiment, the switch can have two positions, wherein the first position can be associated with the receptacle port 454 and the second position can be associated with the accessory port 456. Switch 476 can be configured such that only one of the receptacle port 454 and the accessory port 456 can receive power from inverter 470 at any particular time. When switch 476 selects receptacle port 454, accessory port 456 can be disconnected and inverter 470 can output approximately 120 VAC (e.g., pulse width modulated) to a receptacle attached to receptacle port 454. However, when switch 476 selects accessory port 456, receptacle port 454 can be disconnected and inverter 470 can be configured to output a suitable voltage to accessory port 456. In one embodiment of the present invention, wherein accessories connected to accessory port 456 can be configured to receive 120 VAC, the voltage output to accessory port 456 by inverter 470 can be 120 VAC. However, if the mower accessories are configured to operate upon 12 VDC (as is often standard), inverter 470 can (through pulse width modulation) output only 12 VDC.

Figure 4F:
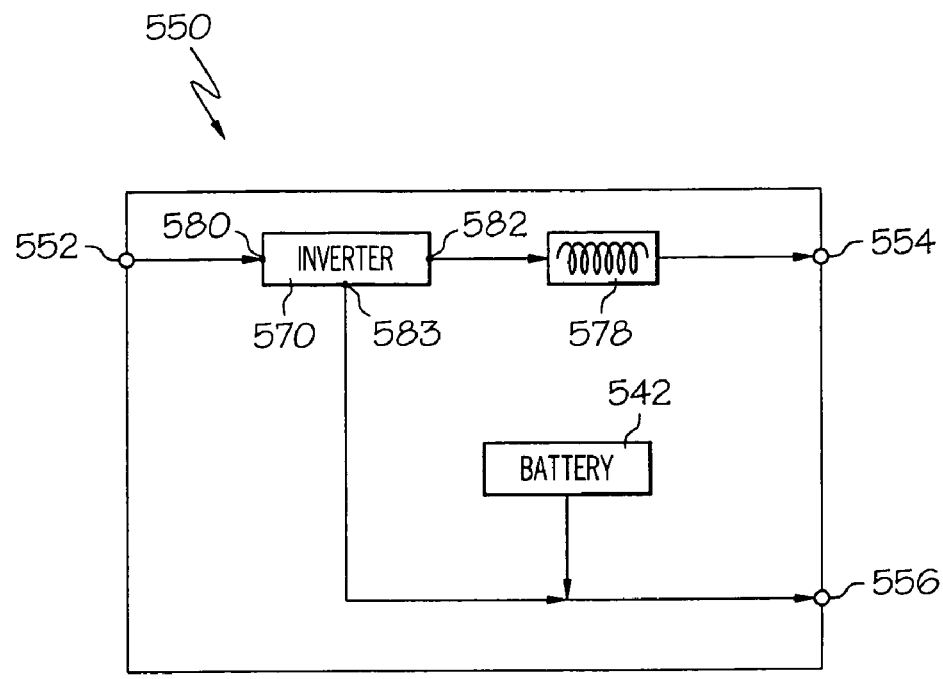
FIG. 4F is a block diagram schematically depicting exemplary interface circuitry in accordance with yet another illustrative embodiment of the present invention.

In accordance with yet other embodiments of the present invention, as depicted by FIG. 4F, interface circuitry 550 can be configured to receive between about 110 VAC and 130 VAC at power input port 552, wherein power input port 552 further connects to power input terminals 580 of inverter 570 (inverter 570 is depicted in further detail in FIG. 5B and is discussed in further depth hereinafter). Furthermore, inverter 570 can be configured with two sets of power output terminals, wherein first power output terminals 582 from inverter 570 can be configured to provide 120 VAC to a receptacle port 554. Inductor 578 can be provided between an inverter and a receptacle to help condition or smoothen the output voltage and/or current waveforms (e.g., to make the waveforms more sinusoidal) generated by an inverter. Second power output terminals 583 from inverter 570 can be configured to provide 12 VDC (through pulse width modulation) to accessory port 556. In some embodiments of the present invention, a battery 542 might also be connected to this second output of inverter 570 in order that battery 542 can receive a charge from inverter 570 and/or can assist inverter 570 in providing power to any accessories attached to accessory port 556.

Figure 5B:
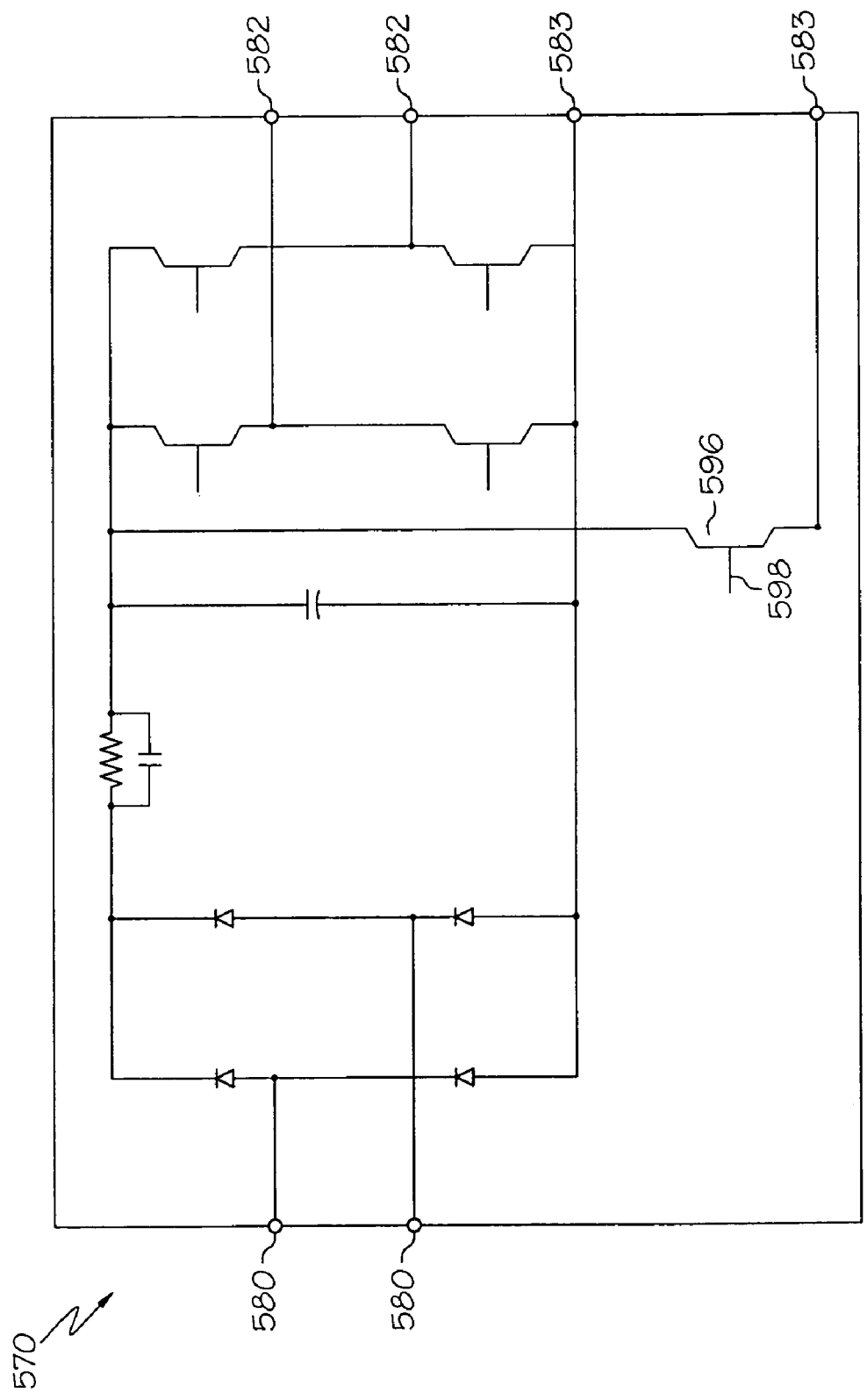
FIG. 5B is a simplified schematic view depicting a portion of an inverter in accordance with another exemplary embodiment of the present invention.

Inverter 570, as shown in FIG. 5B, comprises power input terminals 580 and power output terminals 582 and 583. In addition to the functionality described with respect to inverter 70 of FIG. 5A, inverter 570 further includes additional output terminals 583 that can be switched by transistor 596 and can be configured to supply power to an accessory port, for example. The base or gate 598 of transistor 596 might be controlled by the microprocessor or controller (not shown) of inverter 570. More particularly, transistor 596 can be switched such that the output voltage on output terminals 583 can be about 12 VDC.

Figure 4G:
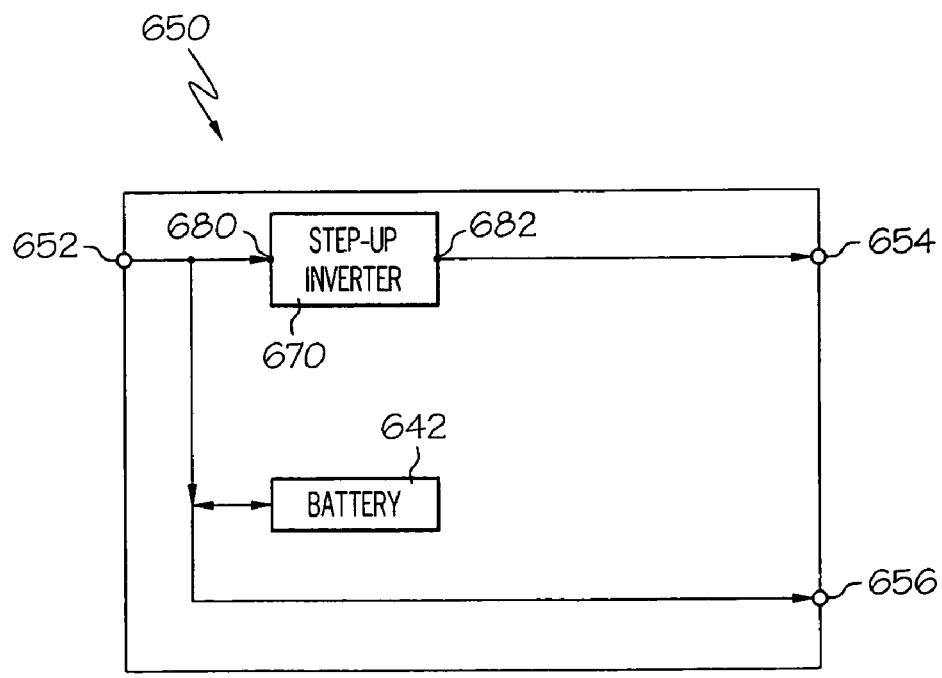
FIG. 4G is a block diagram schematically depicting exemplary interface circuitry in accordance with still another illustrative embodiment of the present invention.

In still a further embodiment of the present invention as depicted by FIG. 4G, interface circuitry 650 can be configured to receive between about 10 VDC and about 18 VDC through power input port 652 from an attached generator. In such an embodiment, this input power can be provided to power input terminals 680 of a step-up inverter 670 (step-up inverter 670 is depicted in further detail in FIG. 5C and is discussed in further depth hereinafter) which can then be output from power output terminals 682 of step-up inverter 670 to receptacle port 654 as 120 VAC. Also, power input port 652 can be connected to accessory port 656 and can be configured to provide electrical power (e.g., 12 VDC) to the accessories. In one exemplary embodiment, a battery 642 can also be connected to accessory port 656.

Figure 5C:
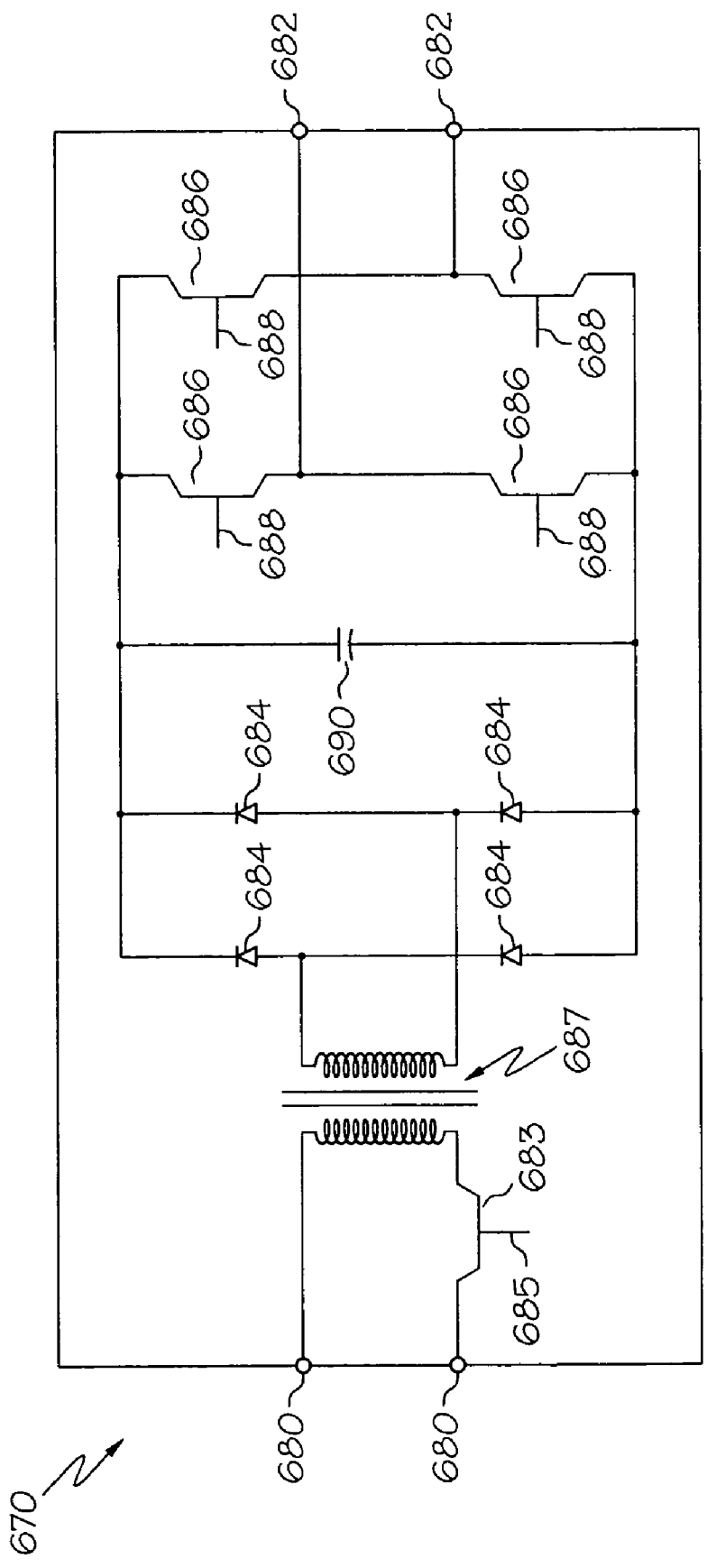
FIG. 5C is a simplified schematic view depicting a portion of an inverter in accordance with yet another exemplary embodiment of the present invention.

Step-up inverter 670, as shown in FIG. 5C, can comprise power input terminals 680 configured to input a relatively low DC voltage (e.g., 12 VDC). For example, if 12 VDC is supplied to power input terminals 680, transistor 683 can be switched on and off rapidly by a processor, controller, or oscillator operably connected to gate or base 685. The switched power from transistor 683 can be fed into a transformer 687 and can then be output from transformer 687 as a higher voltage AC. This higher voltage AC can then be converted into a high voltage DC by diodes 684, wherein the high voltage DC (e.g., 170 VDC) can then be conditioned by capacitor bank 690. This high voltage DC can then be switched (e.g., through pulse width modulation) by transistors 686, wherein bases or gates 688 of transistors 686 can be driven by a controller or microprocessor such that the power output from power output terminals 682 of inverter 670 is appropriate (e.g., 120 VAC).

It is to be understood from the foregoing examples that exemplary interface circuitry in accordance with the present invention can be configured to receive, for example, AC and/or DC in virtually any voltage and/or frequency from the generator. The interface circuitry can employ any of a variety of components to manipulate and/or condition this input power in order to provide a suitable voltage to an associated receptacle. In addition, this interface circuitry might further be configured to provide a portion of the input power for use by one or more accessories on the mower. Although recited components include diodes, inverters, transformers and batteries, the interface circuitry might also comprise a host of other components and combinations. For example, the interface circuitry might include fuses, circuit breakers, disconnect switches, and/or other protective devices. As another example, interface circuitry might include capacitors to assist in preventing electrical noise or for smoothening DC. Also, interface circuitry might include a variety of electronic components (e.g., microprocessors, memory, controllers, etc.) for use in controlling the sequence and detailed operation of an exemplary mower in accordance with the present invention. It should also be understood that the interface circuitry can be centralized or dispersed among one or more locations upon an associated piece of power equipment. For example, in one embodiment, an inverter can be at least partially integral with the engine, generator, and/or an enclosure associated with a receptacle. In such an embodiment, other components of the interface circuitry can be disposed either along with the inverter or can be located elsewhere upon the power equipment.

Although the foregoing description relates primarily to exemplary illustrations with respect to a walk-behind lawn-mower having a generator and a receptacle, it should be understood that the power generation system as described herein can also be associated with many varieties of power equipment including but not limited to lawn tractors, snow blowers, trimmers, tillers, ditch diggers, chainsaws, rotary saws, chippers/shredders, and hedge trimmers. Of course, the specific nature of the power generation system will vary depending upon the type of power equipment with which the power generation system is associated.

The foregoing description of exemplary embodiments and examples of the invention has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. The scope of the invention is, of course, not limited to the examples or exemplary embodiments set forth herein, but can be employed in any number of applications and equivalent devices by those of ordinary skill in the art. Rather, it is hereby intended that the scope of the invention be defined by the claims appended hereto.

What is claimed is:

1. A power equipment apparatus comprising:
   an internal combustion engine;
   a generator having a rotor and a coil assembly, the rotor being rotationally movable with respect to the coil assembly, the rotor and the coil assembly being integrated with the internal combustion engine such that the rotational movement of the rotor provides inertia for facilitating ongoing operation of the internal combustion engine, wherein the generator is configured to generate electrical power;
   interface circuitry comprising an inverter, the inverter being coupled with the generator and being configured to receive at least some of the electrical power from the generator, the inverter being further configured to dispense conditioned electrical power;
   an electronic speed regulation system coupled with the interface circuitry and with the internal combustion engine, the electronic speed regulation system being configured to automatically adjust the speed of the internal combustion engine; and
   a receptacle electrically coupled with the interface circuitry and configured to receive and to provide an operator with access to the conditioned electrical power.

2. The power equipment apparatus of claim 1 wherein said conditioned electrical power at the receptacle measures about 120 volts AC.

3. The power equipment apparatus of claim 1 further comprising a mowing blade, wherein the internal combustion engine comprises a crankshaft and the mowing blade is supported by the crankshaft.

4. The power equipment apparatus of claim 1 further comprising a clutch and a mowing blade, the clutch coupling the internal combustion engine with the mowing blade, wherein the clutch is operative to selectively disengage the mowing blade from the internal combustion engine when an operator indicates an intention to access the receptacle.

5. The power equipment apparatus of claim 3 further comprising a deck being substantially formed from a material having a relatively high electrical resistance such that the deck is a poor conductor of electricity.

6. The power equipment apparatus of claim 1 further comprising a drive wheel and an electric motor, the drive wheel being configured to be rotatably driven by the electric motor, wherein the electric motor is coupled with the generator and is configured to receive at least some of the electrical power from the generator.

7. The power equipment apparatus of claim 1 further comprising an immobilizing device for selectively preventing movement of the power equipment apparatus when the conditioned electrical power is accessed at the receptacle.

8. A walk-behind mower comprising:
   a deck being substantially formed from a material having a relatively high electrical resistance such that the deck is a poor conductor of electricity;
   an internal combustion engine adjacent to the deck and having a generator integral with the internal combustion engine, wherein the generator is configured to generate electrical power;
   interface circuitry comprising an inverter, the inverter being coupled with the generator and being configured to receive at least some of the electrical power from the generator, the inverter being further configured to dispense conditioned electrical power;
   an electronic speed regulation system coupled with the interface circuitry and with the internal combustion engine, the electronic speed regulation system being configured to automatically adjust the speed of the internal combustion engine;
   a receptacle electrically coupled with the interface circuitry and configured to receive and to provide an operator with access to the conditioned electrical power; and
   a mowing blade coupled with the internal combustion engine and configured to be selectively rotated by the internal combustion engine.

9. The walk-behind mower of claim 8 wherein the conditioned electrical power measures about 120 volts AC.

10. The walk-behind mower of claim 8 further comprising a drive wheel and an electric motor, the drive wheel being configured to be rotatably driven by the electric motor, wherein the electric motor is coupled with the generator and is configured to receive at least some of the electrical power from the generator.

11. The walk-behind mower of claim 8 further comprising an immobilizing device for selectively preventing movement of the walk-behind mower when the conditioned electrical power is accessed at the receptacle.

12. The walk-behind mower of claim 8 wherein the generator includes a rotor and a coil assembly, the rotor being rotationally movable with respect to the coil assembly, the rotor and the coil assembly being integrated with the internal combustion engine such that the rotational movement of the rotor provides inertia for facilitating ongoing operation of the internal combustion engine.

13. A walk-behind mower comprising:
   a deck being substantially formed from a material having a relatively high electrical resistance such that the deck is a poor conductor of electricity;
   an internal combustion engine adjacent to the deck, the internal combustion engine comprising a crankshaft;

a generator operatively coupled to the internal combustion engine and configured to generate electrical power;

a receptacle electrically coupled with the generator and configured to provide an operator with access to the electrical power;

a mowing blade selectively engaged with the crankshaft; and a clutch operative to selectively disengage the mowing blade from the crankshaft when an operator accesses the electrical power from the receptacle.

14. The walk-behind mower of claim 13 further comprising interface circuitry and an electronic speed regulation system, the interface circuitry having an inverter, the inverter being coupled with the generator and being configured to receive at least some of the electrical power from the generator, the inverter being further configured to provide conditioned electrical power for dispensation from the receptacle, the electronic speed regulation system coupled with the interface circuitry and with the internal combustion engine, and the electronic speed regulation system being configured to automatically adjust the speed of the internal combustion engine.

15. The walk-behind mower of claim 14 wherein the generator includes a rotor and a coil assembly, the rotor being rotationally movable with respect to the coil assembly, the rotor and the coil assembly being integrated with the internal combustion engine such that the rotational movement of the rotor provides inertia for facilitating ongoing operation of the internal combustion engine.

16. The walk-behind mower of claim 13 further comprising a drive wheel and an electric motor, the drive wheel being configured to be rotatably driven by the electric motor, wherein the electric motor is coupled with the generator and is configured to receive at least some of the electrical power from the generator.

17. The power equipment apparatus of claim 1 wherein the electronic speed regulation system is configured to automatically adjust the speed of the internal combustion engine in response to variations in electrical power output from the receptacle.

18. The power equipment apparatus of claim 5 wherein the material comprises plastic.

19. The walk-behind mower of claim 8 wherein the material comprises plastic.

20. The walk-behind mower of claim 8 further comprising a clutch, the clutch coupling the internal combustion engine with the mowing blade, wherein the clutch is operative to selectively disengage the mowing blade from the internal combustion engine when an operator indicates an intention to access the receptacle.

21. The walk-behind mower of claim 8 wherein the electronic speed regulation system is configured to automatically adjust the speed of the internal combustion engine in response to variations in electrical power output from the receptacle.

22. The walk-behind mower of claim 13 wherein the electronic speed regulation system is configured to automatically adjust the speed of the internal combustion engine in response to variations in electrical power output from the receptacle.

23. The walk-behind mower of claim 13 further comprising an immobilizing device for selectively preventing movement of the walk-behind mower when the conditioned electrical power is accessed at the receptacle.

24. The walk-behind mower of claim 13 wherein the material comprises plastic.

* * * * *